Aug. 30, 1955    W. E. JOHNSON ET AL    2,716,453
KEYBOARD OPERATED MECHANICAL MACHINES FOR PERFORATING CARDS
Filed Feb. 12, 1953    6 Sheets-Sheet 1
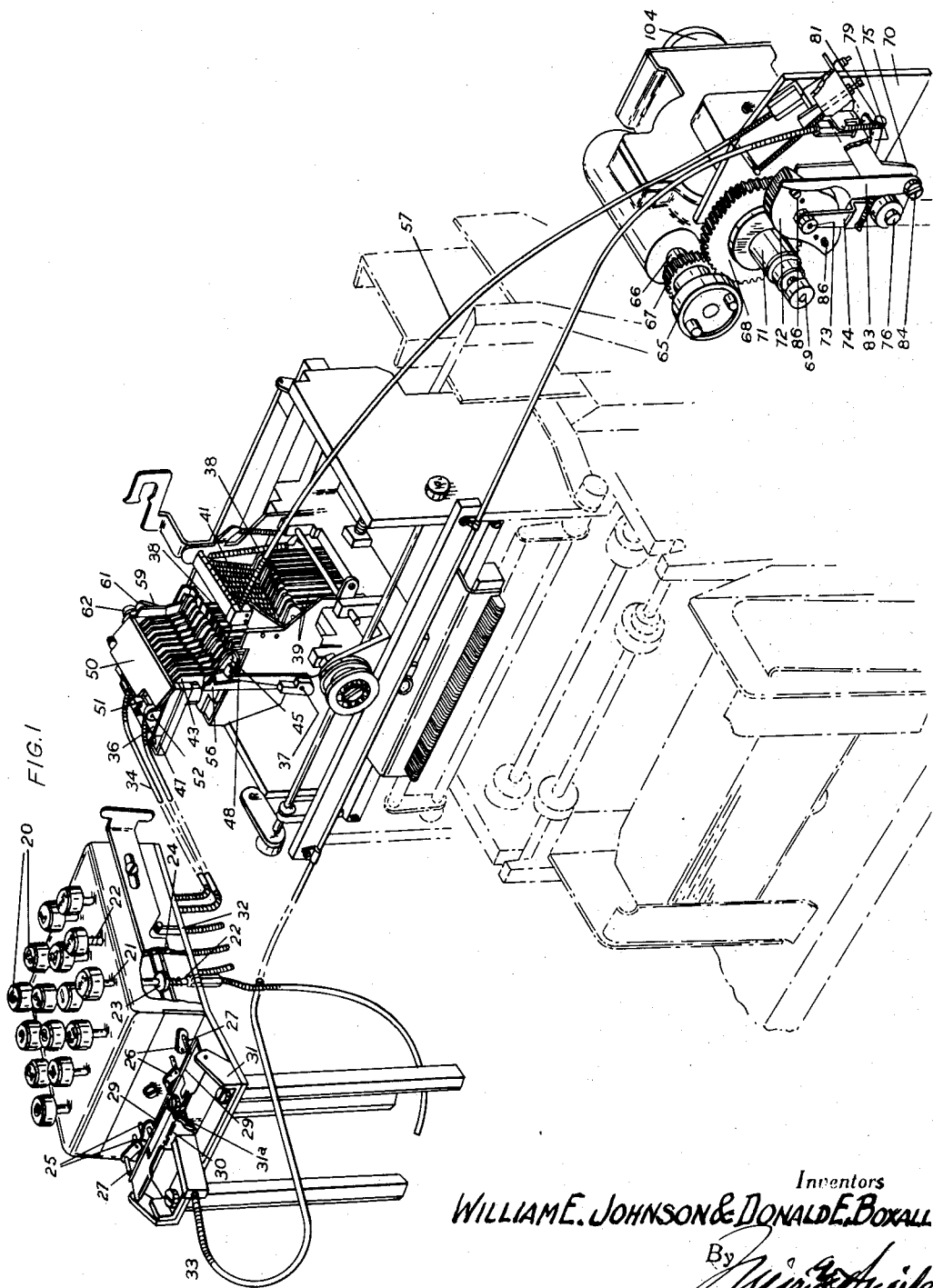
Inventors
WILLIAM E. JOHNSON & DONALD E. BOXALL Aug. 30, 1955  W. E. JOHNSON ET AL  2,716,453
KEYBOARD OPERATED MECHANICAL MACHINES FOR PERFORATING CARDS
Filed Feb. 12, 1953  6 Sheets-Sheet 2
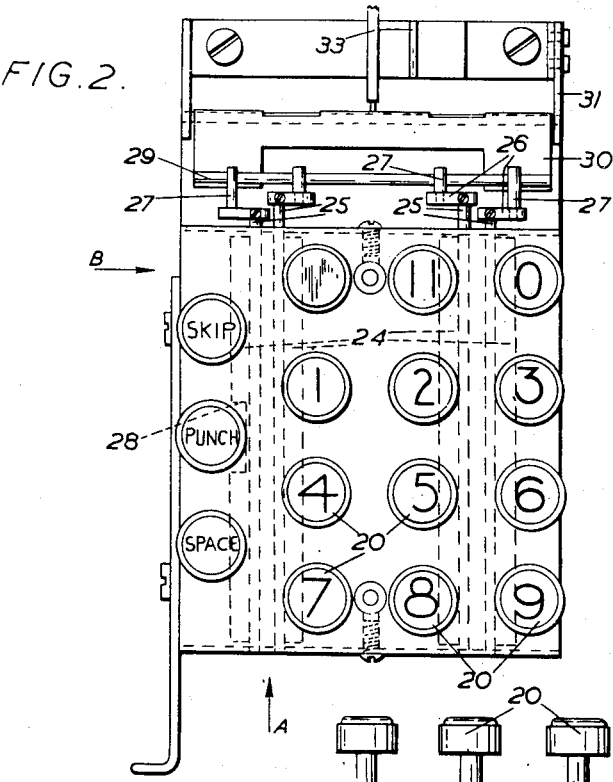
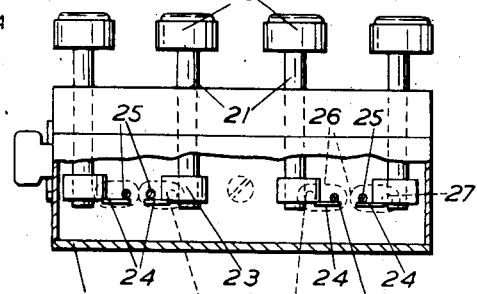
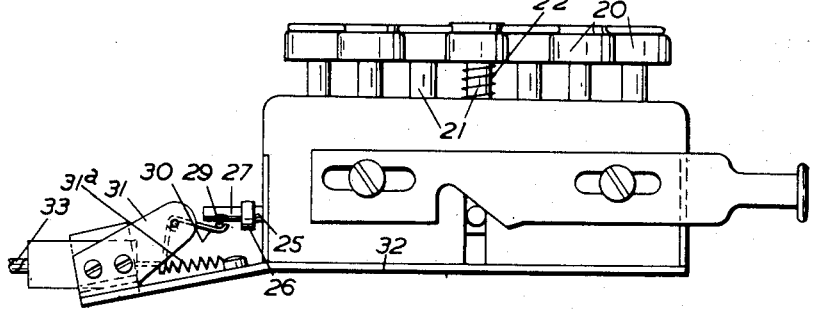
Inventors
WILLIAM E. JOHNSON
DONALD E. BOXALL
By
Attorney

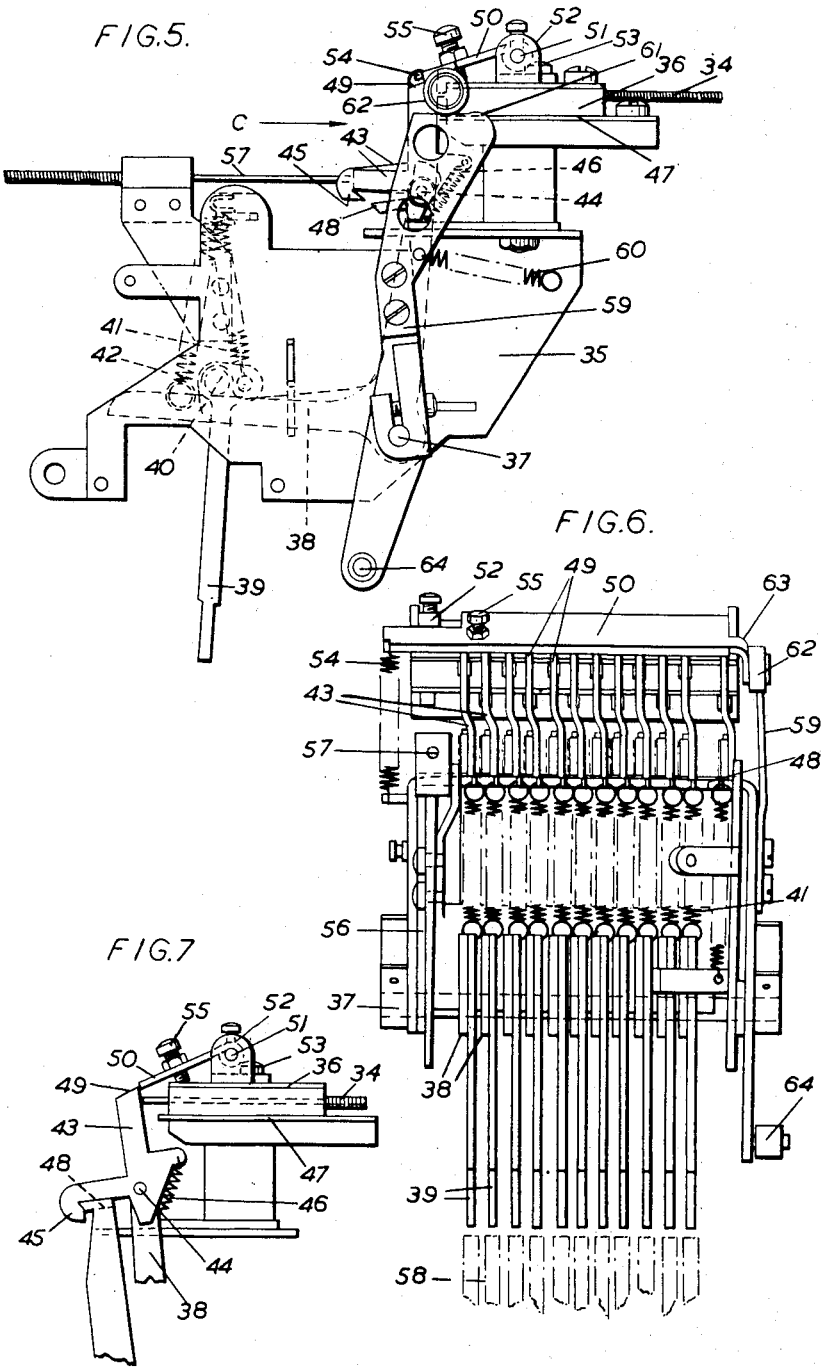

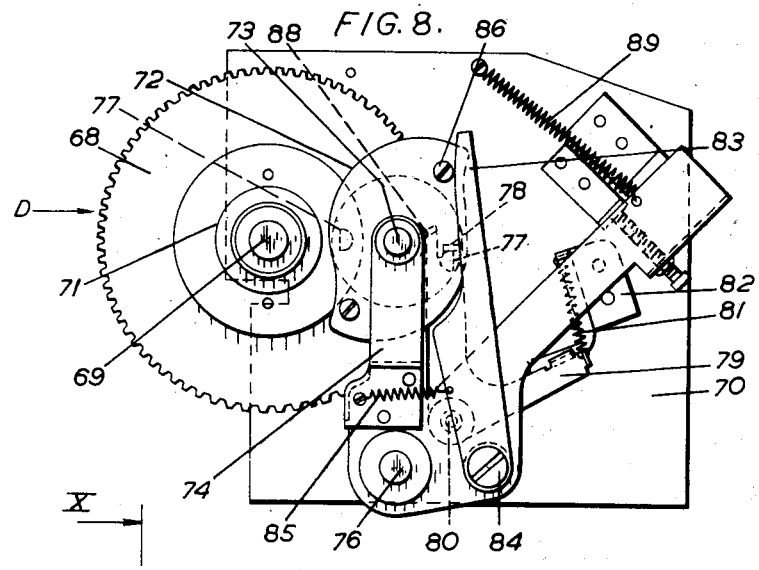
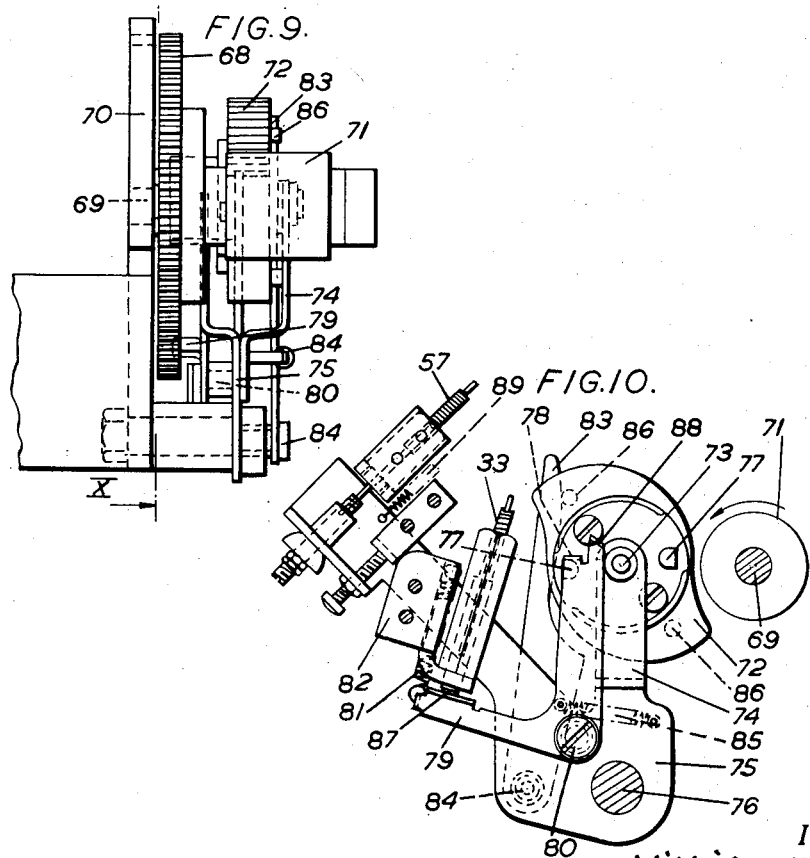

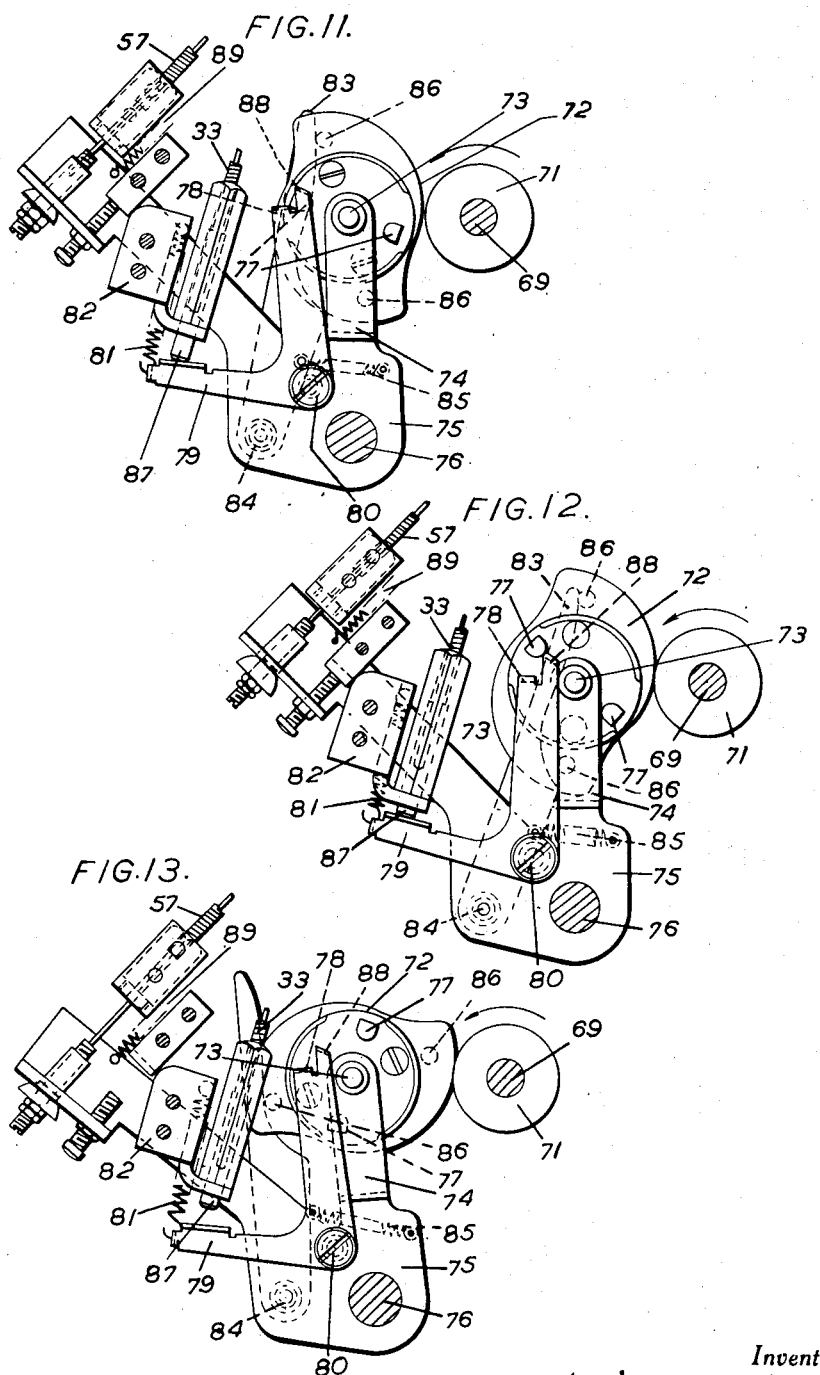

Aug. 30, 1955 W. E. JOHNSON ET AL 2,716,453
KEYBOARD OPERATED MECHANICAL MACHINES FOR PERFORATING CARDS
Filed Feb. 12, 1953 6 Sheets-Sheet 6
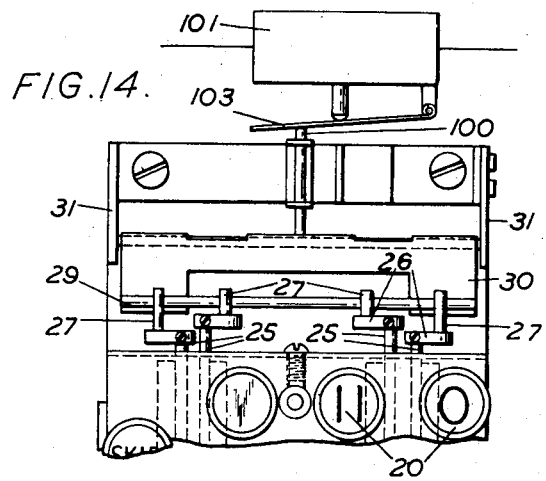
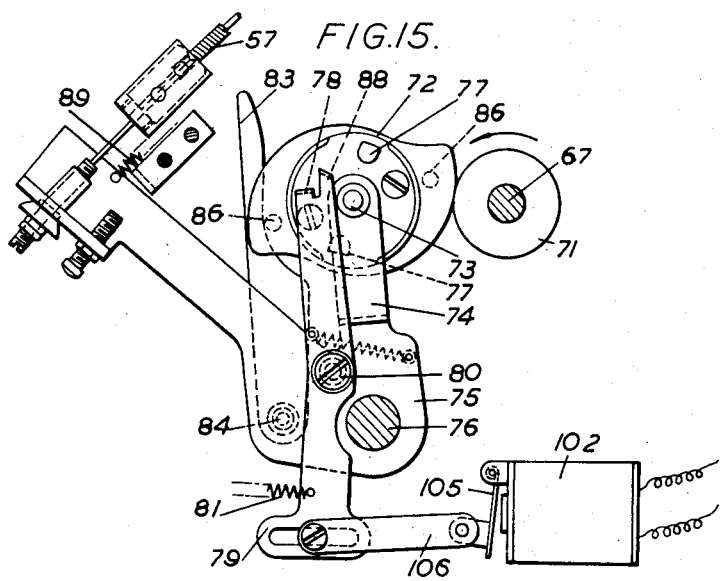
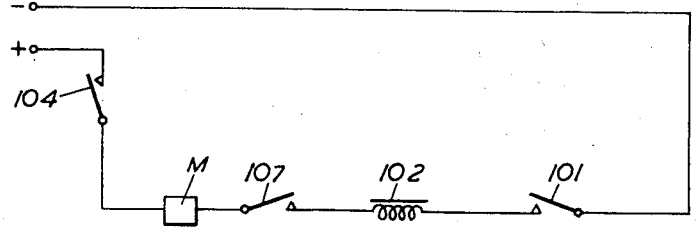
Inventors
WILLIAM E. JOHNSON
DONALD E. BOXALL
By
Attorney

United States Patent Office 2,716,453
Patented Aug. 30, 1955

2,716,453

KEYBOARD OPERATED MECHANICAL MACHINES FOR PERFORATING CARDS

William Edward Johnson, Streatham, London, and Donald Edward Boxall, Mitcham, England, assignors to Powers-Samas Accounting Machines Limited, London, England, a British company Application February 12, 1953, Serial No. 336,624

Claims priority, application Great Britain March 25, 1952

10 Claims. (Cl. 164—112)

This invention relates to keyboard-operated machines for perforating cards, particularly statistical record cards.

In United States patent specification No. 1,858,174, there is described a card perforating machine which includes a keyboard having spring-restored keys, columns of punches settable by set-bars selectively operable by a column of interponents, one for each punch of a column, pivotally mounted on a carriage movable stepwise to dispose the interponents over successive columns of set bars, interponent being movable angularly about the pivot from an inactive to active position to effect operation of a set-bar.

In machines of the kind just mentioned the interponents are moved from inactive to active position by an impulse applied directly thereto by a Bowden cable actuated by depression of a key appropriated thereto. Accordingly, the setting of a punch through its set-bar and interponent is effected solely by the manual depression of the appropriate key and this has necessitated the use of a key having a relatively long stroke and the application thereto of considerable force.

It is a main object of the present invention to provide that setting of a punch through its set-bar and interponent is effected by power operated means, the interponent merely being conditioned for operation as the result of depression of its appropriate key, thereby permitting the use of a key which can be fully operated by a relatively light manual pressure applied thereto.

As is well understood in the art, data is sometimes represented according to a code by two or more perforations in a single column of a card thus necessitating the simultaneous depression of two or more keys. With a machine of the known kind mentioned above it is imperative when punching according to a code that all keys representative of data for a single column be simultaneously fully depressed, because the carriage escapement is operated by a restoring bar which comes into operation immediately a set-bar has been actuated to effect setting the punch with which it co-operates. Thus, if during code punching one key should be depressed and released in advance of another which should be simultaneously depressed there is the possibility that the escapement may be operated before the second key is fully depressed, thereby resulting in incorrect punching.

It is a further object of the present invention to provide means which ensure that no interponent is operated until all the keys appropriated to interponents are in their restored condition.

According to the present invention there is provided in a machine of the kind described apparatus comprising conditioning means individual to each interponent and operable by depression of a key appropriated thereto to condition the interponent for movement to the active position thereof, a power operated actuating member common to the interponents to move conditioned ones thereof angularly about their pivot to effect operation of set-bars, driving means effective to operate the actuating member, and interrupter means operatively connecting the driving means with all keys appropriated to interponents and operable by and during depression of any of said keys to render said driving means ineffective to operate the actuating member.

In order that the invention may be clearly understood two embodiments thereof will now be described, by way of example, with reference to the accompanying diagrammatic drawings, in which:

Fig. 1 is a diagrammatic perspective view of a part of a machine for perforating cards, only the portions thereof relative to the present invention being fully indicated in the figure, Fig. 2 is a top plan of the keyboard for the machine, Fig. 3 is a view, partly in section, taken in the direction of arrow A, Figure 2, Fig. 4 is an elevation looking in the direction of arrow B, Figure 2, Fig. 5 is a side elevation of a part of the carriage unit supporting interponents for effecting setting of set bars in the punch unit of the machine, Fig. 6 is an elevation looking in the direction of arrow C, Figure 5, Fig. 7 illustrates a part of the mechanism shown in Fig. 5, the parts illustrated being shown in positions different from those which they occupy in Figure 5, Fig. 8 is an elevation showing mechanism for effecting power actuation of interponents supported by the carriage unit, Fig. 9 is an end view looking in the direction of arrow D, Figure 8, Fig. 10 is an elevation taken on lines X—X, Figure 9, and Figs. 11 to 13 are views similar to that of Fig. 10, but each showing some of the parts in positions which they occupy at different stages of their operation and with reference to the accompanying diagrammatic drawings in which:

Fig. 14 illustrates a modification to the keyboard,

Fig. 15 is a view similar to Fig. 10 and shows a modification thereto, and

Fig. 16 is a circuit diagram.

The general construction of the machine to which the present invention is applied is similar to that of the machine described and illustrated in the aforesaid United States patent specification No. 1,858,174 and there will be described below only the new mechanism constructed according to the present invention.

The machine described in United States patent specification No. 1,858,174, comprises means by which cards to be perforated are fed from a magazine into a vertically reciprocable die which co-operates with punches disposed in columns one for each column of the card, each column of punches including a punch for each data indicating position in that column. The punches are selected for operation by a column of interponents supported by a carriage movable stepwise over the columns of punches, the interponents being actuated by Bowden cables operated from a keyboard and, on operation, being arranged to operate a set bar to effect setting of the selected punch. The machine is provided with escapement mechanism and carriage return mechanism as is customary in perforating machines of this character and the machine is driven through clutch mechanism coupled to an electric motor.

According to the present invention, operation of a key appropriated to one of the interponents on the carriage unit does not effect actuation of a set bar but is arranged to condition the interponent for actuation by a power operated actuating member.

Referring to Figures 1 to 4, the keyboard comprises three columns of keys 20 each mounted on a stem 21, Figures 3 and 4, supported for axial movement against a spring 22 which is operative to restore the key to its inactive position. The spring for the "punch" key, however, is positioned beneath the head of that key. Near the lower or inner end of the stem is a collar 23 secured thereto by a grub screw or the like, not shown. The collars of the keys of each column are disposed to overlie a thin plate 24 secured to a spindle 25 for angular movement therewith. To the outer end of the spindle 25 is secured an arm 26 from which extends a pin 27 eccentric with the axis of the spindle 25. As shown in the drawing, four columns of keys are employed, each column having a plate 24. Only three of the columns of keys, however, are appropriated to interponents supported by the carriage for effecting selection of punches, the three keys of the fourth column being respectively, a skip key, a punch key and a space key and, as can be seen from Figure 2, the skip and space keys are arranged to co-operate with a plate 24 but the plate for this column is cut away at 28 so that it will not be rocked by depression of the punch key.

The pins 27 are so disposed as to overlie a rod 29 secured to a pivoted element formed by a flap 30 supported for swinging movement by a bracket 31 secured to a base plate 32 on which the keyboard is also supported and arranged, as described below, to control the movement of interrupter means from an inactive to the active position thereof. The flap 30 is spring-urged against the pins 27 by a spring 31a, Fig. 4, the purpose of which is to ensure that the plates 24 are maintained in contact with collars 23 which form crank-operating members. Depression of any of the keys with the exception of the punch key will cause one of the cranks formed by a plate 24, a spindle 25, arm 26, and pin 27 to be rocked by a crank-operating member 23 about the axis of its spindle 25 thereby depressing the rod 29 and causing swinging movement of the flap 30 to effect operation of interrupter means which, in the embodiment of the invention now being described, comprises the inner member of a Bowden cable 33 hereinafter referred to as the interrupter cable.

Each key appropriated to an interponent on the carriage unit is, on depression of the key, arranged to actuate the inner member of a Bowden cable 34, Figures 1, 5 and 7, hereinafter referred to as a conditioning cable, the remote ends of the cables being retained in position relative to the carriage unit 35 by clamping means 36.

The carriage unit 35 is, as previously stated, similar to that described in United States patent specification No. 1,858,174 and supports a rocking spindle 37. A column of interponents is freely pivoted on the rocking spindle 37 and each interponent comprises a bell crank 38 having one substantially horizontal arm, one substantially vertical arm, and a member 39 pivoted at 40 to the substantially horizontal arm. Each interponent is controlled and urged in a clock-wise direction, as viewed in Figure 5, by a spring 41. As just described the arrangement of the interponent is the same as that employed in the machine described in the aforesaid United States patent specification No. 1,858,174. In the construction according to the present invention, however, the substantially vertical arm of the bell crank 38 is shorter than that heretofore employed, because it is not acted upon directly by the conditioning cable 34 as was the case in the machine described in United States patent specification No. 1,858,174.

Referring to Figures 5, 6 and 7, it will be seen that near the upper end of the vertical arm of the bell crank 38 is a latch 43, the latch being a bell crank pivoted at 44 to the vertical arm of the bell crank 38. One arm of the latch is provided with a hook 45 and the other arm of the latch extends upwards and is urged by a spring 46 towards a stop plate 47 against which it is retained until it is moved about its pivot 44 on actuation of the conditioning cable 34 appropriated thereto. On actuation of the conditioning cable 34, the latch 43 is turned about its pivot in a counterclockwise direction, as viewed in Figure 7, to a position at which the hook 45 thereof is located to be engaged by an angularly movable actuating member 48 common to the latches 43 of each of the interponents. As can be seen from Figure 5, when the latches 43 are in their inactive positions the hooks 45 thereof are retained in positions such that they will not be engaged by the actuating member 48 on forward or counterclockwise movement thereof, as viewed in Figure 5.

From the drawings it will be seen that the upper edges 49 of the latches 43 are chamfered and when, as in Figure 5 the latches are in their restored position, the chamfered edges 49 are located beneath a flap 50 pivoted at 51 in a bracket 52 secured by screws 53 to the clamping member 36. The flap 50 is urged downwards by a light spring 54, Figure 6, and an adjustable stop screw 55 determines the extent of downward movement of the flap. As a latch is moved counterclockwise by its conditioning cable 34 it cams upwards the flap 50 until it is moved beyond the leading edge of the flap when the flap returns to its down position, as shown in Figure 7, and is positioned to retain the latch 43 in its actuated condition against the action of its spring 46.

The actuating member 48 is an inverted U-shaped member the base of which acts as an actuating member common to all of the latches 43. The arms of the actuating member are secured to the rocking spindle 37 for rocking movement therewith and also secured to the rocking spindle 37 is an operating lever 56, Figure 1, for actuation by driving means which includes a Bowden cable 57 hereinafter referred to as an actuator cable. When the actuator cable 57 is operated after setting of the latches 43 it acts to pull the operating lever 56 in a clockwise direction, as viewed in Figure 1, so that the actuator member 48 engages and moves each of the conditioned latches 43, together with the interponents 38 to which they are pivoted, in a counterclockwise direction, as viewed in Figure 5, thereby causing the member 39 to be moved downwards and actuate a set bar 58, Figure 6, which, in turn, conditions the punch in known manner, not shown, co-operating therewith for a punching operation. Also secured to the rocking spindle 37 is an operating plate 59 to which is connected a spring 60 against the action of which the actuator member is moved by the actuator cable 57. The upper edge 61 of the plate 59 is in the form of a cam track engaged by a roller 62 carried by a depending lug 63 on the plate 50 and during the return movement of the actuator member 48 the cam 61 lifts the plate 50 to permit those latches 43 which have been actuated to pass thereunder and return to their inactive positions against the stop plate 47, Fig. 5. One of the limbs of the actuator member 48 supports a roller 64 which, in known manner, operates the carriage escapement mechanism.

The machine is driven by an electric motor M, Fig. 16, connection between the electric motor and the machine being effected by a coupling 65, Figure 1, secured to a shaft 66. Secured to the shaft 66 for rotation therewith is a gear wheel 67 meshing with a further gear wheel 68 freely rotatable on a spindle 69 supported by a bracket plate 70. The gear wheels 67 and 68 are continuously rotated by the motor and secured to the gear wheel 68 for rotation therewith is a driving roller 71 having a rubber or like peripheral surface to make frictional engagement with the serrated or otherwise roughened periphery of a double snail cam 72. The snail cam is supported for rotation by a spindle 73 rotatable in bearings formed by a fork 74 on a rocking operating arm 75 which is supported for rocking movement about a stud shaft 76 extending outwards from the bracket plate 70. As can be seen from Figures 8 and 10, the snail cam is so shaped that when no keys of the keyboard are depressed it is not engaged by the continuously rotated roller 71. At this time the position of the snail cam is determined by one of a pair of stop pins 77 which abut the under side of a first stop 78 comprising an overturned portion of a trip latch 79 which is pivoted at 80 to the operating arm 75. The trip latch 79 is urged clockwise, as viewed in Figure 10, by a spring 81 one end of which is connected to a bracket 82 fixed to the bracket plate 70.

A lever 83 is pivoted at 84 to the operating arm 75 and is urged by a spring 85 in a clockwise direction as viewed in Figure 10. The purpose of the lever 83 is to effect a preliminary rotation of the snail cam 72 in a clockwise direction, as viewed in Figure 10, towards the continuously rotated driving roller 71, and to this end it engages one or other of two abutments 86 which extend laterally from the cam 72 on the side thereof opposite from the side on which the stop pins 77 are located. When a key 20 is operated, it actuates the interrupter cable 33 in the manner described above, thus applying an impulse to a plunger 87, Figs. 10 to 13 to effect axial movement of the plunger thereby to move the trip latch 79 counter-clockwise, as viewed in Figure 10, to a position at which it is disengaged from the stop pin 77. On disengagement of the stop 78 from the stop pin 77 the lever 83, under the influence of its spring 85, rotates the snail cam clockwise until further rotation thereof is prevented by a second stop 88, also formed as an overturned portion on the trip latch 79, as illustrated in Figure 11. From Figure 11 it will be seen that the stops 78 and 88 are formed on the trip latch 79 at different distances from the pivot 80 therefore and they are successively engageable by a stop 77. It will also be observed that the stops 78 and 88 are spaced apart by a distance such as to permit a stop pin 77 to pass therebetween.

On restoration of all depressed keys 20 the interrupter cable 33 permits the trip latch 79 to return to the position shown in Figure 10, this movement being effected by the spring 81. The return movement of the trip latch, however, disengages the stop 88 from the stop pin 77 and as the pin 77 has been advanced to a position beyond that of the stop 78 the lever 83 again effects rotation of the snail cam 72 in a clockwise direction, Figure 12, but now moves the periphery of the snail cam into engagement with the continuously rotated roller 71. The snail cam 72 is now rotated by the roller 71 and as the hump of the cam engages the roller 71, operating arm 75 is rocked counter-clockwise, Figure 13, about its pivot 76 so that the actuator cable 57 which is connected thereto is pulled downwards against the action of a spring 89 tending to urge the operating arm 75 in a clockwise direction. The pulling of the actuator cable 57 effects operation of the operating lever 56 and the actuator member 48 in the manner described above. Figure 12 illustrates the position occupied by the parts just as snail cam 72 is moved by the lever 83 into engagement with the roller 71 and Figure 13 illustrates the position occupied by the parts when the cam 72 has effected actuation of the actuator cable 57. It will be observed from Figure 13 that the stop 78 on the trip latch 79 is at this time in position to be engaged by the second of the stop pins 77, and when this occurs the position of the parts will be as illustrated in Figure 10.

In operation, when any key 20 of the first three columns of keys is actuated, such keys being appropriated one to each of the interponents 38, the key operates its conditioning cable 34 which, in turn, actuates the latch 43 to condition the interponent connected thereto for positive operation by the power operated actuator member 48. The depression of the key also, through a plate 24, pin 27, rod 29, and flap 30 effects actuation of the interrupter cable 33, thereby tripping the stop 78 out of engagement with the stop pin 77, and permitting the snail cam 72 to turn to a position at which the pin 77 is engaged by the stop 88. If, however, more than one key 20, other than the punch key, has been depressed the stop 88 will remain in the path of the stop pin 77 until such time as all of the keys are restored, and only then will the snail cam 72 be engaged with the continuously driven roller 71 so that power operation of the actuator member 48 is effected. Thus it will be understood that all interponents in the column thereof appropriated to actuated keys 20 must be condition before they can be operated by the actuator member 48 common thereto, and it is not possible for the actuator member to be operated before a setting is completed, assuming that all the keys which are to be operated to effect setting have been at least partially depressed prior to the release of any of the keys. Further, since the escapement mechanism is, as is customary, actuated during the restoration of the interponents the carriage unit will not be advanced until the whole setting for a column of punches has been effected and the punches conditioned as the result of the power operation of the actuator member.

The modified embodiment of the invention illustrated in Figs. 14 to 16 is similar to that described above except that the shape of the trip latch 79 is modified for operation by a solenoid actuated by electrical impulses initiated by a modified form of the keyboard.

Referring to Fig. 14, the interrupter cable 33 described above is replaced by plunger 100, an electric operating switch 101, a solenoid 102, and electrical connection therebetween. The plunger 100 is supported for axial movement by the flap 30 when the latter is caused to swing as described above. The plunger 100 co-operates with the pivoted actuating arm 103 of the switch 101, which is a normally open switch closed by depression of any of the keys 20, through flap 30 and plunger 100.

As can be seen from Fig. 16, the switch 101 is included in the circuit for motor M, the circuit being initially conditioned by the manual closing of a starting switch 104, Figs. 1 and 16. Also in the circuit is a solenoid 102, Figs. 15 and 16, the armature 105 of which, Fig. 15, is connected by a link 106 to the trip latch 79. An impulse to solenoid 102 causes the latch 79 to be operated in the manner described above.

To avoid operation of the latch 79, and consequent operation of the actuating member 48, during the period when the carriage return mechanism is operative a control switch 107, Fig. 16, is included in the circuit. As stated above, the machine is driven through the usual clutch mechanism, not shown, and the normally stationary member of the clutch mechanism, when in the stationary position thereof, is arranged to retain control switch 107 in the closed position thereof and also, when being rotated by the continuously driven clutch member, to hold the control switch 107 open during the carriage return periods. Control switch 107 thus ensures that no member 39 is moved downwards during a carriage return period even though a key 20 may be operated at that time.

We claim:

1. In a machine for perforating record cards and including a keyboard having spring-restored keys, columns of punches settable by set-bars selectively operable by a column of interponents, one for each punch of a column, pivotally mounted on a carriage movable stepwise to dispose the interponents over successive columns of set bars, an interponent being movable angularly about the pivot from an inactive to active position to effect operation of a set bar, apparatus comprising conditioning means individual to each interponent and operable by depression of a key appropriated thereto to condition the interponent for movement to the active position thereof, a power operated actuator member common to the interponents to move conditioned ones thereof angularly about their pivot to effect operation of set-bars, driving means effective to operate the actuator member, and interrupter means operatively connecting the driving means with all keys appropriated to interponents and operable by and during depression of any of said keys to render said driving means ineffective to operate the actuator member.

2. Apparatus according to claim 1, wherein the conditioning means comprises for each interponent a latch pivoted on the interponent and spring-urged to inactive position from which it is moved to active position by a conditioning cable operated by a key appropriated thereto, and a hook movable with said latch on movement thereof to active position for disposition in the path of said actuator member whereby on operation of the actuator member the hook is engaged thereby to effect movement of its interponent to active position.

3. Apparatus according to claim 2, including a spindle pivotally mounted in said carriage, and an operating lever on said spindle to effect angular movement thereof on operation of said driving means.

4. Apparatus according to claim 3, wherein the driving means comprises an actuator cable to effect angular movement of the operating lever, a rockable operating arm to which one end of the actuator cable is connected, a driving roller supported for continuous rotation, a snail cam rotatable in bearings movable with the rockable operating arm for peripheral frictional engagement with said roller and for disengagement therefrom, and a lever pivoted on said operating arm and spring-urged into engagement with an abutment extending laterally from the cam and tending to turn the cam in its bearings into engagement with the driving roller.

5. A machine according to claim 4, wherein the interrupter means comprises a trip latch pivotally mounted on the operating arm for co-operation with said conditioning cable, a stop pin extending laterally from said cam, and two stops successively engageable by the stop pin and carried by the trip latch at different distances from the trip latch pivot and spaced apart to permit said stop pin to pass therebetween, the stop pin being engaged by a first one of said stops prior to actuation of a key and by the second of the stops on the rendering active of the interrupter means by depression of a key and being disengaged from the second stop on the rendering inactive of the interrupter means by the restoration of the key to the normal position thereof thereby permitting said lever to move the cam into engagement with the driving roller for rotation thereby until it is again arrested by said first stop.

6. Apparatus according to claim 5, including a pivoted element to control the movement of the interrupter means from the inactive to the active position thereof, a crank co-operating with said pivoted element to effect pivotal movement thereof, and a crank-operating member connecting the crank with a key for operation on depression of the key.

7. Apparatus according to claim 6, wherein the interrupter means comprises an interrupter cable.

8. Apparatus according to claim 6, wherein the interrupter means comprises a solenoid, the armature of which is connected to the trip latch, a normally open operating switch in the solenoid circuit closed by said pivoted element to render the solenoid active, and a control switch in the solenoid circuit operable to close the circuit only when return mechanism for the carriage is inoperative.

9. In a machine for perforating record cards and including a keyboard having spring-restored keys, columns of punches settable by set-bars selectively operable by a column of interponents, one for each punch of a column, pivotally mounted on a carriage movable stepwise to dispose the interponents over successive columns of set bars, an interponent being movable angularly about the pivot from an inactive to active position to effect operation of a set bar, apparatus comprising conditioning means individual to each interponent and operable by depression of a key appropriated thereto to condition the interponent for movement to the active position thereof, a power operated actuator member common to the interponents to move conditioned ones thereof angularly about their pivot to effect operation of set-bars, driving means effective to operate the actuator member, a driver movable into and out of operative engagement with said driving means and co-operating with the actuator member to effect operation thereof under control of the driving means, and driver conditioning means connecting said keyboard and driver and operable by and during depression of any key appropriated to an interponent to disengage the driver from operative engagement with said driving means.

10. In a machine for perforating record cards and including a keyboard having spring-restored keys, columns of punches settable by set-bars selectively operable by a column of interponents, one for each punch of a column pivotally mounted on a carriage movable stepwise to dispose the interponents over successive columns of set-bars, an interponent being movable angularly about the pivot from an inactive to active position to effect operation of a set-bar, apparatus comprising conditioning means individual to each interponent and operable by ?pression of a key appropriated thereto to condition the ...iterponent for movement to the active position thereof, a power operated actuator member common to the interponents to move conditioned ones thereof angularly about their pivot to effect operation of set-bars, driving means effective to operate the actuator member, a driver movable into and out of operative engagement with said driving means and co-operating with the actuator member to effect operation thereof under control of the driving means, and a driver conditioning cable connecting said keyboard and driver and operable by and during depression of any key appropriated to an interponent to disengage the driver from operative engagement with said driving means.

References Cited in the file of this patent

UNITED STATES PATENTS

| 1,695,965 | Lasker et al. | Dec. 18, 1928 |
| 1,823,550 | Kurowski | Sept. 15, 1931 |
| 1,858,174 | Thomas | May 10, 1932 |
| 1,870,184 | Thomas et al. | Aug. 2, 1932 |